Oct. 2, 1956        L. A. COREY        2,765,069
THREAD ADVANCING REEL
Filed Dec. 15, 1952
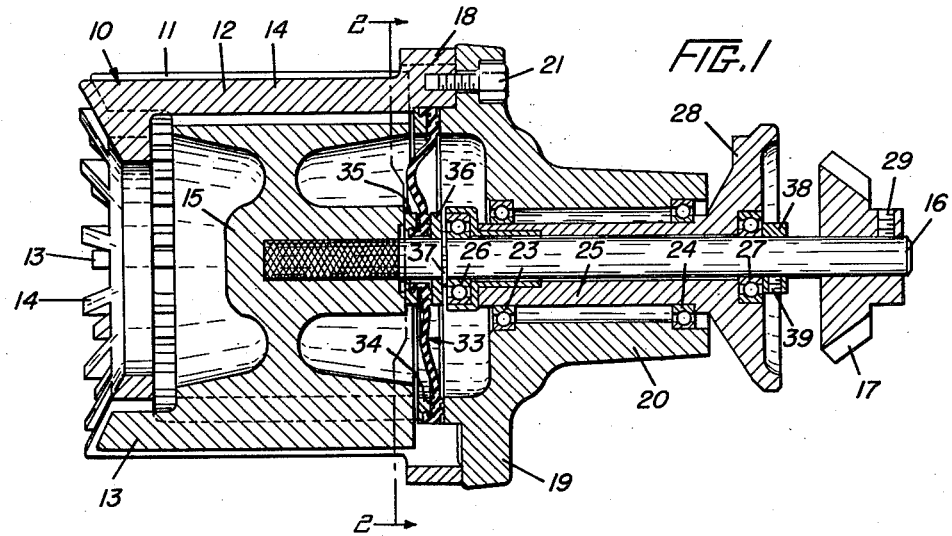
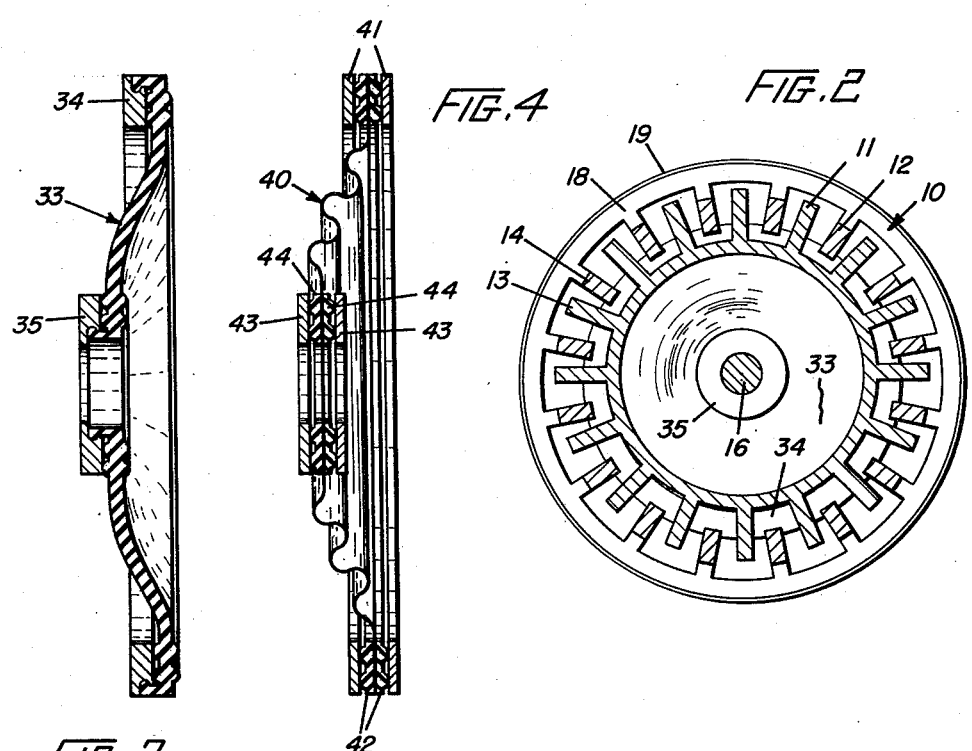
INVENTOR
LORIN A. COREY
BY Thomas S. Mayner
ATTORNEY United States Patent Office 2,765,069
Patented Oct. 2, 1956

2,765,069

THREAD ADVANCING REEL

Lorin A. Corey, Cleveland Heights, Ohio, assignor to Industrial Rayon Corporation, Cleveland, Ohio, a corporation of Delaware Application December 15, 1952, Serial No. 326,067

4 Claims. (Cl. 203—183)

This invention relates to thread-advancing reels and more particularly to a reel comprising two offset and angularly displaced reel members having peripheries of longitudinally extending bar members in an interdigitating relation, and which reel upon rotation advances thread lengthwise of its periphery in the form of a helix.

More specifically, this invention relates to an improvement in driving one of the reel members mounted for free rotation through the second reel member which is usually fixed to a driven reel shaft. Displaced reel members are known to be driven through couplings such as the gears shown in the Torrence et al. Patent No. 2,255,017. It is, however, not necessary in a number of thread processing steps to provide for reel member driving gears to overcome the possibility of frictional bar member to bar member contact with resulting wear and a weakening of their structures, and the elimination of relative motion between the reel members which tends to induce barre in a thread being processed. In processing steps such as desulphuring, washing, and bleaching, the thread is in a generally relaxed condition while on a reel having only sufficient tension to provide good tracking contact for advancing purpose. A positive drive and predetermined positioning, nevertheless, are necessary for the freely rotatable reel member to overcome the aforesaid mentioned disadvantages.

This invention is directed to the provision of a one-piece flexible coupling joining the two reel members for driving the freely rotatable reel member. The flexible coupling can be, advantageously, a unitary member which is attached to each reel member or secured between the reel members; and because of the offset and displaced axes of the two reel members the imparted distortions are overcome because of the resilient nature of the coupling. The predetermined relation between the reel members is substantially constantly maintained by means of the coupling to thus prevent contact or relative motion between the bar members of the reel members during the rotation of the reel.

The advantages of such a flexible drive coupling will be described in the following specification and the attached drawing, where:

Figure 1 represents in section a thread-advancing reel wherein the freely rotating reel member is driven through a resilient coupling;

Figure 2 is a cross-section of the reel of Figure 1 taken across lines 2—2;

Figure 3 is a section of the flexible member; and

Figure 4 is a section of a modification of the flexible coupling member of Figure 3.

The reel 10 of Figure 1 comprises two reel members 11 and 12 each having a similar plurality of longitudinally extending bar members 13 and 14 respectively arranged in an interdigitating relation.

The concentric reel member 11 of the reel is press-fitted onto a knurled end of the reel supporting shaft 16 while the eccentrically mounted reel member 12 is freely rotatably mounted in a manner hereinafter explained. The reel shaft 16 is driven through a gear 17 positioned about its other end and secured to the shaft by a stud screw 29. The bar members 14 of the eccentric reel member 12 merge into a flanged section 18, which section is fastened to a complementary flange 19 forming part of the hub member 20. The two flanges 18, 19 are secured to each other by bolts 21 extending through the flange 19 into the eccentric reel flange 18. The hub 20 is supported for rotation by spaced bearings 23 and 24 that are positioned about an eccentric sleeve 25 having an offset and askew axis relative to the axes of the concentric reel member 11, the sleeve is itself mounted about the reel shaft 16 on spaced bearings 26 and 27. The reel shaft 16 extends through the eccentric sleeve 25 and rotates therein in the spaced bearings 26, 27.

The reel 10 is adapted to be stationarily supported in the face of a rayon spinning machine (not shown) by means of the flange 28 forming part of the sleeve 25. When the shaft 16 is driven by the gear 17 the concentric reel member 11 mounted thereon will, if permitted, cause the rotation of the eccentric reel member and thread will be advanced in a plurality of helical turns. The freely rotating reel member can be driven through contact between the bar members 13 and 14. Where the rotation of the reel member 12 is had through contact with the bars of reel members, there will occur, in addition to the constant rotation of the concentric reel member 11, a relative motion between the reel members, and some times back-lash. Further, the relative rotation of the freely rotatable reel member 12 with respect to the fixed reel member 12 during a processing step can effect changes in the tension of thread being processed which changes may cause a barre effect resulting in a poorly dyeing thread. Neither the frictional bar-to-bar contact or relative bar member motion is desirable, and the wear of bar members and of back-lash are advantageously prevented through the utilization of a flexible coupling between the two reel members.

Where the reel is not subject to great stresses such as occur during a drying process of thread or yarn on the reel a unitary flexible coupling 33 for driving the eccentric reel member 12 desirably can be provided. Such a coupling can be constructed from a resilient rubber-like material so as to readily flex in the complex directions dictated by the positioning of the reel member axes, and it will maintain the reel members in a predetermined position. When properly assembled the coupling member 33 will maintain the bar members from contacting each other upon rotation of the reel, as shown in Figure 2. The material of which the coupling 33 is made should be pliable or flexible and of sufficient cross-section and strength so as to readily yield to the stresses imparted to it by the rotation of the reel, and by the accumulated wetted thread on the reel. The coupling member can be of rubber, or a composition of rubber and textile materials, leather, or of synthetic rubber-like materials, e. g. teflon, etc. Also, other materials such as metals and metal alloys can be utilized for the coupling member, as shown in Figure 4.

Referring to Figures 1 and 3, the rubber-like flexible coupling member 33 is fastened or held in compression by its outer enlarged rim between the flanges 18 and 19. A ring 34 designed to fit the compressible rim of the coupling 33 is positioned in a recessed portion of the flange 18 and the central ring portion of the coupling member 33 is held fast, also in compression, between companion rings 35 and 36 positioned about the reel shaft 16. The central ring or collar 36 is compressed or abutted against splined ring 37 positioned in a groove in the shaft 16. The entire assembly is maintained in position against movement by the hub 15, splined ring 36 and by means of a collar 38 having a set screw 39 bearing into the shaft 16. The collar 38 abuts the bearing 27 which in turn positions and maintains the eccentric sleeve 25 against displacement.

In lieu of the rubber-like coupling 33 a metallic coupling 40, which can be any of the number of metals or metal alloys available, as shown in Figure 4, can be employed. The plurality of corrugations in the metallic coupling advantageously permits its distortion in a manner dictated by the rotation of the reel members about their offset and angularly displaced axes.

The single piece or unitary coupling as described herein between the two offset and askew reel members desirably should be of materials that are resistant to corrosion, especially corrosion from alkali or acid solutions which are utilized in the liquid processing, or after treatment, of viscose rayon or thread.

I claim:

1. In a thread-advancing reel comprising two reel members mounted for rotation about offset axes angularly displaced relative to each other and in which one reel member is positively driven and the other freely rotating, a one-piece flexible coupling member having limited torsional deflection secured to each of said reel members for spacing one member from the other to prevent their contact during rotation, said coupling member being the sole means for driving said freely rotatable reel member.

2. A thread-advancing reel in accordance with claim 1 in which each of the reel members has a periphery of longitudinally extending bar members arranged in interdigitating relation and said coupling securing said reel members each to the other in a manner to provide for predetermined clearance between the bar members during rotation of the reel.

3. A thread-advancing reel in accordance with claim 1 in which the flexible coupling member is of a metallic material.

4. A thread-advancing reel in accordance with claim 1 in which the flexible coupling member is of a material other than metal.

References Cited in the file of this patent

UNITED STATES PATENTS

| | | |
|---|---|---|
| 293,141 | Brotherhood | Feb. 5, 1884 |
| 2,056,197 | Knebusch | Oct. 6, 1936 |
| 2,107,689 | Bugatti | Feb. 8, 1938 |
| 2,217,717 | Torrence et al. | Oct. 15, 1940 |
| 2,244,119 | Samerdyke | June 3, 1941 |